(12) United States Patent
Ronaghi et al.

(10) Patent No.: US 8,702,948 B2
(45) Date of Patent: Apr. 22, 2014

(54) METHOD AND APPARATUS USING ELECTRIC FIELD FOR IMPROVED BIOLOGICAL ASSAYS

(75) Inventors: Mostafa Ronaghi, San Diego, CA (US); Tarun Khurana, Stanford, CA (US); Juan G. Santiago, Stanford, CA (US)

(73) Assignee: The Board of Trustees of the Leland Stanford Junior University, Palo Alto, CA (US)

(*) Notice: Subject to any disclaimer, the term of this patent is extended or adjusted under 35 U.S.C. 154(b) by 38 days.

(21) Appl. No.: 13/618,228

(22) Filed: Sep. 14, 2012

(65) Prior Publication Data
US 2013/0008789 A1    Jan. 10, 2013

Related U.S. Application Data

(62) Division of application No. 12/170,941, filed on Jul. 10, 2008, now Pat. No. 8,277,628.

(60) Provisional application No. 60/959,398, filed on Jul. 13, 2007.

(51) Int. Cl.
*G01N 27/26* (2006.01)
*B81B 1/00* (2006.01)

(52) U.S. Cl.
USPC ........... 204/547; 204/600; 204/643; 204/400; 204/450; 422/68.1; 422/82.01; 422/82.02; 435/6.1; 435/6.19; 435/288.7; 435/287.1

(58) Field of Classification Search
USPC .............. 204/400, 457, 450, 600–650, 547; 435/4–40.52, 288.7, 287.1; 422/68.1, 422/82.01, 82.02
See application file for complete search history.

(56) References Cited

U.S. PATENT DOCUMENTS

| 5,527,670 A | 6/1996 | Stanley |
| 5,653,939 A | 8/1997 | Hollis et al. |
| 5,661,028 A | 8/1997 | Foote |

(Continued)

FOREIGN PATENT DOCUMENTS

| EP | 1520623 A2 | 4/2005 |
| WO | 97/34689 A1 | 9/1997 |
| WO | 99/06836 A1 | 2/1999 |

OTHER PUBLICATIONS

Intellectual Property Office of Singapore Examination Report, Application No. 200908514-3, May 20, 2011, 6 pp.

(Continued)

*Primary Examiner* — Jennifer Dieterle
(74) *Attorney, Agent, or Firm* — David J. Aston; Peters Verny, LLP

(57) ABSTRACT

Disclosed are a method and apparatus that use an electric field for improved biological assays. The electric field is applied across a device having wells, which receive reactants, which carry a charge. The device thus uses a controllable voltage source between the first and second electrodes, which is controllable to provide a positive charge and a negative charge to a given electrode. By controlled use of the electric field charged species in a fluid in a fluid channel are directed into or out of the well by an electric field between the electrodes. The present method involves the transport of fluids, as in a microfluidic device, and the electric field-induced movement of reactive species according to various assay procedures, such as DNA sequencing, synthesis or the like.

8 Claims, 6 Drawing Sheets

(56) References Cited

U.S. PATENT DOCUMENTS

| | | | |
|---|---|---|---|
| 5,728,532 | A | 3/1998 | Ackley |
| 5,824,477 | A | 10/1998 | Stanley |
| 5,846,708 | A | 12/1998 | Hollis et al. |
| 5,858,195 | A | 1/1999 | Ramsey |
| 5,965,452 | A | 10/1999 | Kovacs |
| 5,968,745 | A | 10/1999 | Thorp et al. |
| 6,017,696 | A | 1/2000 | Heller |
| 6,033,850 | A | 3/2000 | Purvis |
| 6,066,448 | A | 5/2000 | Wohlstadter et al. |
| 6,093,300 | A | 7/2000 | Hayashizaki et al. |
| 6,136,171 | A | 10/2000 | Frazier et al. |
| 6,207,369 | B1 | 3/2001 | Wohlstadter et al. |
| 6,225,059 | B1 | 5/2001 | Ackley et al. |
| 6,238,909 | B1 | 5/2001 | Choong et al. |
| 6,287,774 | B1 | 9/2001 | Nikiforov |
| 6,291,185 | B1 | 9/2001 | Purvis |
| 6,482,306 | B1 | 11/2002 | Yager et al. |
| 6,518,022 | B1 | 2/2003 | Sosnowski et al. |
| 6,733,244 | B1 | 5/2004 | Fritsch et al. |
| 6,734,436 | B2 | 5/2004 | Faris et al. |
| 6,838,053 | B2 | 1/2005 | John et al. |
| 6,913,679 | B1 * | 7/2005 | Mathies et al. ............. 204/451 |
| 6,960,298 | B2 | 11/2005 | Krotz et al. |
| 6,977,722 | B2 | 12/2005 | Wohlstadter et al. |
| 6,989,086 | B2 | 1/2006 | Cheng et al. |
| 7,014,992 | B1 | 3/2006 | Kayyem et al. |
| 7,070,681 | B2 | 7/2006 | Santiago |
| 7,070,810 | B2 | 7/2006 | Hirsch et al. |
| 7,172,864 | B1 | 2/2007 | Heller et al. |
| 7,185,697 | B2 | 3/2007 | Goodson et al. |
| 7,217,542 | B2 | 5/2007 | Tyvoll et al. |
| 7,220,344 | B2 | 5/2007 | Bentsen et al. |
| 7,238,268 | B2 | 7/2007 | Ramsey et al. |
| 7,294,503 | B2 | 11/2007 | Quake et al. |
| 7,390,622 | B2 | 6/2008 | Yu et al. |
| 7,776,542 | B1 | 8/2010 | Aoyagi et al. |
| 2002/0058332 | A1 | 5/2002 | Quake et al. |
| 2002/0125134 | A1 | 9/2002 | Santiago et al. |
| 2003/0146100 | A1 | 8/2003 | Huang et al. |
| 2003/0148328 | A1 * | 8/2003 | Kayyem et al. ............. 435/6 |
| 2003/0215865 | A1 | 11/2003 | Mayer et al. |
| 2004/0007463 | A1 * | 1/2004 | Ramsey et al. ............. 204/450 |
| 2004/0256230 | A1 | 12/2004 | Yager et al. |
| 2005/0098299 | A1 | 5/2005 | Goodson et al. |
| 2005/0124979 | A1 | 6/2005 | Santini, Jr. et al. |
| 2005/0173249 | A1 | 8/2005 | Barlow et al. |
| 2005/0211559 | A1 | 9/2005 | Kayyem |
| 2005/0244954 | A1 * | 11/2005 | Blackburn et al. ......... 435/287.2 |
| 2006/0081474 | A1 * | 4/2006 | Bryning et al. ............. 204/547 |
| 2006/0105373 | A1 | 5/2006 | Pourmand et al. |
| 2007/0059763 | A1 | 3/2007 | Okano et al. |
| 2007/0114180 | A1 | 5/2007 | Ramanathan et al. |
| 2009/0309773 | A1 | 12/2009 | Rohaghi et al. |

OTHER PUBLICATIONS

Intellectual Property Office of New Zealand Examination Report, Application No. 2582456, May 26, 2011, 2 pp.

English Translation of Office Action from Japanese Application 2010-516240, Oct. 23, 2012, 2 pages.

Ronald G. Sosnowski, et al., "Rapid determination of single base mismatch mutations in DNA hybrids by direct electric field control," PNAS, Feb. 1997, vol. 94, 1119-1123.

Carl F. Edman, "Electric field directed nucleic acid hybridization on microchips," Nucleic Acid Research, 1997, vol. 25, No. 24, 4907-4914.

Devin Dressman, et al., "Transforming single DNA molecules into fluorescent magnetic particles for detection and enumeration of genetic variations," PNAS, Jul. 22, 2003, vol. 100, No. 15, 8817-8822.

David Erickson, et al., "Electrokinetically Controlled DNA Hybridization Microfluidic Chip Enabling Rapid Target Analysis," Analytical Chemistry, Dec. 15, 2004, vol. 76, No. 24, 7269-7277.

David Erickson, et al., "Electrokinetically Based Approach for Single-Nucleotide Polymorphism Discrimination Using a Microfluidic Device," Analytical Chemistry, Jul. 1, 2005, vol. 77, No. 13, 4000-4007.

Marcel Margulies, et al., "Genome sequencing in microfabricated high-density picolitre reactors," Nature, Sep. 15, 2005, vol. 437, 376-380.

International Search Report and Written Opinion, Oct. 3, 2008.

European Search Report, Application No. EP08781608.8, Aug. 16, 2013, 4 pp.

* cited by examiner

A – no beads in wells;

B – beads in wells

METHOD AND APPARATUS USING ELECTRIC FIELD FOR IMPROVED BIOLOGICAL ASSAYS

CROSS-REFERENCE TO RELATED APPLICATIONS

This application is a divisional application of U.S. patent application Ser. No. 12/170,941, filed on Jul. 10, 2008, which claims priority from U.S. Provisional Patent Application No. 60/959,398 filed on Jul. 13, 2007, which are hereby incorporated by reference in their entirety.

STATEMENT OF FEDERALLY-SPONSORED RESEARCH

The invention was made with Government support under contract HG000357 awarded by the National Institutes of Health. The Government has certain rights in this invention.

REFERENCE TO SEQUENCE LISTING, COMPUTER PROGRAM, OR COMPACT DISK

None

BACKGROUND OF THE INVENTION

1. Field of the Invention

The present invention relates to the field of biological assays and apparatus for carrying out such assays, such as a microfluidic device, to which is applied electric fields to control movement of charged molecules. The assays involve charged molecular species, such as nucleotides (due to phosphate ions), or other molecules which contain a charge due to their ionic nature, such as certain proteins or small molecules.

2. Related Art

Advances in silicon microfabrication have been used to produce microchannels and microarrays for many lab-on-a-chip platforms. Advantages include low reagent costs, miniaturization, and fast reaction rates. However, the challenge is to efficiently isolate and deposit biological samples into individual wells for high-throughput analysis. Recently, random arrays have been implemented in which solid-supports are used to individually capture unique biological molecules and deposit these solid supports into reaction wells with a geometry of the same size range. Another challenge these platforms are faced with is when repetitive assay are performed on the same bead isolated within a well. A good example where these challenges are common is DNA sequencing.

In certain methods of DNA sequencing, DNA is immobilized on a solid support, and nucleotides and enzymes are delivered to the DNA for successive incorporation of nucleotides. This is commonly referred to as DNA sequencing using sequencing-by-synthesis. Nucleotides are removed through washing to allow iterative nucleotide addition. One of the main challenges in sequencing by synthesis is to deliver the nucleotide to the vicinity of DNA to enable rapid incorporation and to remove the nucleotide efficiently to enhance the read-length.

PARTICULAR PATENTS AND PUBLICATIONS

Dressman et al., "Transforming single DNA molecules into fluorescent magnetic particles for detection and enumeration of genetic variations," Proc Nat Acad Sci Jul. 22, 2003, vol. 100, no. 15, pp 8817-8822, discloses a technique in which each DNA molecule in a collection of such molecules is converted into a single magnetic particle to which thousands of copies of DNA identical in sequence to the original are bound. Variation within the original population of DNA molecules can then be simply assessed by counting fluorescently labeled particles via flow cytometry. This approach is called BEAMing on the basis of four of its principal components (beads, emulsion, amplification, and magnetics). After PCR cycling, the microemulsion is broken by detergent, and the beads are separated from the oil phase by centrifugation, and by placing the tube on an MPC-S magnet from Dynal.

Margulies et al., "Genome sequencing in microfabricated high-density picoliter reactors," Nature 437, 376-380 (2005) discloses a method and apparatus for sequencing by synthesis which uses open wells of a fiber optic slide. The method uses a modified pyrosequencing protocol that is designed to take advantage of the small scale of the wells. The fiber optic slides are manufactured by slicing of a fiber optic block that is obtained by repeated drawing and fusing of optic fibers. The slide, containing approximately 1.6 million wells, is loaded with beads and mounted in a flow chamber designed to create a 300-mm high channel, above the well openings, through which the sequencing reagents flow. The unetched base of the slide is in optical contact with a second fiber optic imaging bundle bonded to a charge-coupled device (CCD) sensor, allowing the capture of emitted photons from the bottom of each individual well. 800 ml of emulsion containing 1.5 million beads are prepared in a standard 2-ml tube. Each emulsion is aliquotted into eight PCR tubes for amplification. After PCR, the emulsion is broken to release the beads, which include beads with amplified, immobilized DNA template and empty beads.

The enriched template-carrying beads are deposited by centrifugation into open wells. Streptavidin-coated SeraMag beads are bound to the biotinylated enrichment primers annealed to the immobilized templates on the DNA capture beads. It is essential not to vortex the beads, as vortexing may break the link between the SeraMag and DNA capture beads.

Erickson et al., "Electrokinetically Based Approach for Single-Nucleotide Polymorphism Discrimination Using a Microfluidic Device," Anal. Chem., 77 (13), 4000-4007, (2005) discloses an electrokinetic approach for single-nucleotide polymorphism (SNP) discrimination using a PDMS/glass-based microfluidic chip. The technique takes advantage of precise control of the coupled thermal (Joule heating), shear (electroosmosis), and electrical (electrophoresis) energies present at an array of probes afforded by the application of external electrical potentials. A four-port device is described, with different voltages applied to different ports.

Chen et al., "Nanopore sequencing of polynucleotides assisted by a rotating electric field," Applied Physics Letters volume 82, number 8, 24 February 2003 1308-1310 disclose a method to control the translocation processes of polynucleotides through a nanopore assisted by a rotating electric field. Although the work is based on a simulation, it is stated that the method can be easily implemented in a nanopore sequencing experiment by adding two pairs of parallel electrodes above the thin film.

Erickson, D., Liu, X., Krull, D., Li, D. "An electrokinetically controlled DNA hybridization microfluidic chip enabling rapid target analysis," Analytical Chemistry, 2004, 76, 7269-7277, discloses a device in which different voltages are applied to different ends of an "H" shaped flow channel. The paper further describes chip fabrication techniques.

Edman et al., "Electric field directed nucleic acid hybridization on microchips," Nucleic Acids Research, Vol 25, Issue 24 4907-4914, discloses a microchip-based nucleic acid array where electronic addressing and/or hybridization is carried out by selective application of a DC positive bias to the individual microelectrodes beneath the selected test sites. This causes rapid transport and concentration of negatively charged nucleic acid molecules over selected locations on the microelectronic array. The nucleic acid (DNA, RNA, polynucleotides, oligonucleotides, etc.) may then be immobilized by direct attachment to the permeation layer overlying the microelectrode or by hybridization to previously addressed and attached nucleic acids. This paper describes buffer conditions and the like which may be adapted in practicing the methods taught here. Sosnowski, R. G., Tu, E., Butler, W. F., O'Connell, J. P. and Heller, M. J. *Proc. Natl. Acad. Sci. USA,* 1997, 94, 1119-1123 (cited in this paper) demonstrates that controlled electric fields can be used to regulate transport, concentration, hybridization, and denaturation of single- and double-stranded oligonucleotides. Discrimination among oligonucleotide hybrids with widely varying binding strengths may be attained by simple adjustment of the electric field strength.

Horejsh et al., "A molecular beacon, bead-based assay for the detection of nucleic acids by flow cytometry," *Nucleic Acids Res.,* 2005, 33(2): e13. discloses another assay format using beads. In this case, a fluid array system using microsphere-conjugated molecular beacons uses a flow cytometer for the specific, multiplexed detection of unlabelled nucleic acids in solution. For this array system, molecular beacons are conjugated with microspheres using a biotin-streptavidin linkage.

U.S. Pat. No. 6,287,774 to Nikiforov, issued Sep. 11, 2001, entitled "Assay methods and system," discloses an assay system comprising a first channel disposed in a body structure. The first channel is fluidly connected to a source of a first reagent mixture, which comprises a first reagent having a fluorescent label, a source of a second reagent that reacts with the first reagent to produce a fluorescently labeled product having a substantially different charge than the first reagent; and a source of a polyion. The system also includes a material transport system for introducing the first reagent, the second reagent and the polyion into the first channel and a detector disposed in sensory communication with the first channel. The detector is configured to detect the level of fluorescence polarization of reagents in the detection zone.

As referenced in the above patent, a controlled electrokinetic transport system is described in detail in U.S. Pat. No. 5,858,195, to Ramsey. Such electrokinetic material transport and direction systems include those systems that rely upon the electrophoretic mobility of charged species within the electric field applied to the structure. Such systems are more particularly referred to as electrophoretic material transport systems. Other electrokinetic material direction and transport systems rely upon the electroosmotic flow of fluid and material within a channel or chamber structure, which results from the application of an electric field across such structures. In brief, when a fluid is placed into a channel, which has a surface bearing charged functional groups, e.g., hydroxyl groups in etched glass channels or glass microcapillaries, those groups can ionize. In the case of hydroxyl functional groups, this ionization, e.g., at neutral pH, results in the release of protons from the surface and into the fluid, creating a concentration of protons at near the fluid/surface interface, or a positively charged sheath surrounding the bulk fluid in the channel. Application of a voltage gradient across the length of the channel, will cause the proton sheath to move in the direction of the voltage drop, i.e., toward the negative electrode.

U.S. Pat. No. 6,733,244 to Fritsch, et al., issued May 11, 2004, entitled "Microfluidics and small volume mixing based on redox magnetohydrodynamics methods," discloses a device where microfluidic channels utilizing magnetohydrodynamics are used to pump very small volumes of solution. The channels have electrodes along the walls of the channel and a current carrying species within the solution carries the current through the solution. The electric field generated by the use of the current carrying species is perpendicular to a magnetic field applied to the channel. The two fields are applied perpendicular to the desired direction of flow. The combination of the electric and magnetic fields causes the solution to flow through the channel, perpendicular to both fields.

It should be noted that the present devices provide an electric field, which can move charged particles (molecules) through a solution. The field does not move the solution itself. Furthermore, the field need not be electromagnetic, and does not rely on ferromagnetic principles to cause movement. That is, one here is not simply attracting beads with a magnet. This would not cause the particle movements described here.

BRIEF SUMMARY OF THE INVENTION

The following brief summary is not intended to include all features and aspects of the present invention, nor does it imply that the invention must include all features and aspects discussed in this summary.

The present invention relates to the use of an electric-field ("e-field") for efficient deposition of charged species, such as beads, molecules (ATP, enzymes), DNA, and the like, onto or in the vicinity of an immobilized reactant. The electric field has been found to be capable of concentration of substrate and enzyme in the vicinity of DNA molecule(s) and efficient nucleotide removal. This technique is implemented in an embodiment of a microfluidic device designed for pyrosequencing. The device is designed to enhance the overall quality of signals obtained from the light generating reactions and to improve the read-length. In particular, we show that one may concentrate or remove nucleotides near or away from beads containing single stranded DNA for enhanced nucleotide incorporation or washing. The technique is generally applicable to any charged species that needs to be concentrated at or removed from the target site for high throughput analysis. This technique uses an AC electric field with DC bias to attract/repel the nucleotides (charged molecules). Changing the polarity of DC bias results in the concentration or removal of nucleotides from the well containing DNA beads. The bias voltage is generally above about 1V, but may be up to a maximum voltage which is limited by dielectric breakdown strength, which may be ~15-20 V or higher.

In certain embodiments, the invention comprises a device having at least one fluid channel and a reaction area defined so as to communicate with the fluid channel. The reaction area may be a well, chamber, tube, or other physical area. The reaction area comprises an opening or exposure to a fluid channel and a bottom offset from the fluid channel, the device being constructed for fluid flow in a direction transverse to reaction area openings, comprising: (a) a first electrode adjacent to the bottom; (b) a second electrode adjacent to the opening; and (c) a controllable voltage source between the first and second electrodes which is controllable to provide an alternating positive charge and a negative charge to a given electrode, and a DC bias voltage, whereby charged species in a fluid in a fluid channel are directed into or out of the reaction area by an electric field between the electrodes.

Since the device may be used in sequencing or other reactions where detection of the reaction is important, the device may further comprise a reaction sensor coupled to the reaction area for detecting reactions in the reaction area. This may be a photomultiplier tube, a CCD or other device. Optical fibers may be used for improved detection. Where the reaction sensor comprises a fiberoptic faceplate, improved sensitivity and specificity may be obtained from each reaction well coupled to the faceplate individually. The reaction sensor comprises a CMOS photosensitive element for detecting low levels of light, and furthermore for quantitating such levels.

The device may further be described as a microfluidic device comprising a working fluid containing beads, wherein the reaction area is a well sized to contain only one bead. In a microfluidic device, the reaction areas may be defined in an inert, solid polymer selected from the group consisting of photoresist and PDMS. If the beads are negatively charged, the present movements are facilitated. These beads may be e.g., polystyrene. The beads may also be magnetic.

In certain embodiments, the electrode adjacent to the bottom is a thin layer of ITO (Indium tin oxide), less than about 150 nm thick. This electrode will be optically transparent for reaction monitoring by the reaction sensor.

The electrodes preferably comprise a dielectric coating. This has been found to prevent corrosion and increase the electric field. The dielectric coating may be, e.g., one or more of Parylene® poly-p-xylylenes, or silicon oxide, or silicon nitride.

The device may be configured as a disposable device adapted to be attached to a separate electronic device, and comprising the appropriate fluid channels and electrodes, e.g., a device for directing charged particle movement in a liquid, wherein said particles are directed into a reaction area, comprising: (a) a first electrode coated with a dielectric material on one side of the liquid in the reaction area; (b) a second electrode coated with a dielectric material on an opposite side of the liquid in the reaction area; (c) a fluid flow channel transverse to the reaction area; and (d) connections for a signal generator for applying both an AC voltage and a DC voltage to the first electrode and the second electrode, whereby the electrodes are constructed and arranged to generate an electric field between them.

The present invention further comprises a method for moving a charged molecular species, as described above, in a microfluidic device, said species moving into a reaction area from a fluid channel communicating with the reaction area, comprising the steps of: (a) flowing the charged molecular species in the fluid channel in a flow direction; (b) providing an electric field having a positive end and a negative end across the reaction area; and (c) and directing the charged molecular species into the reaction area by applying a charge to the electric field in the reaction area opposite to the charge on the molecular species. In one aspect of this embodiment, more than one molecular species is moved into the reaction area, thereby causing a reaction between the molecular species. In another aspect, one or more molecular species is already in the reaction area, causing a reaction between the charged molecular species and the one or more molecular species in the reaction area. The electric field contains an AC component at a frequency of at least 100 kHz and, preferably, a DC bias voltage, which may be at least 1 Volt, but generally is not of high voltage. The method may further comprise the step of reversing the polarity of the DC bias voltage, to direct the charged molecular species out of the reaction area.

DETAILED DESCRIPTION OF THE PREFERRED EMBODIMENT

Definitions

Figure 1:
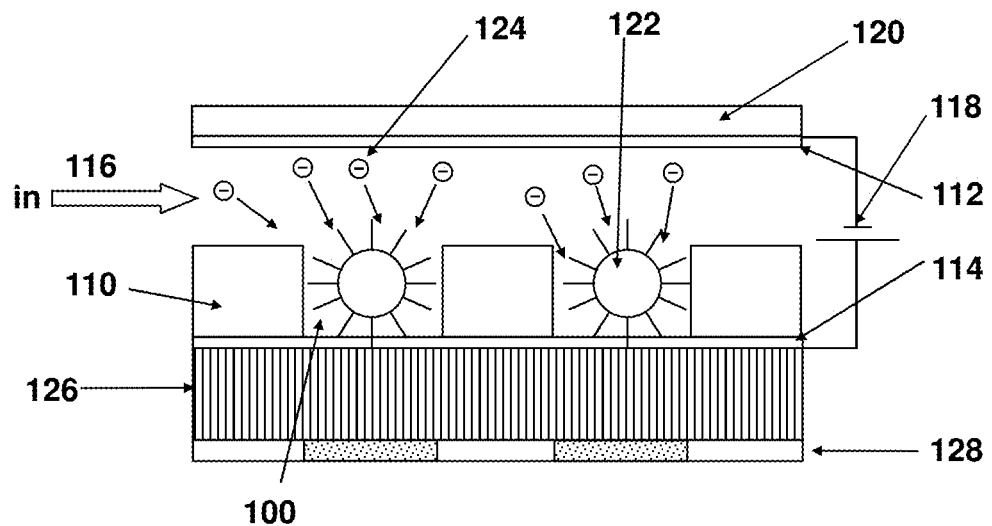
FIG. 1 is a schematic of a device according to the present invention showing a fiber optic faceplate with microfabricated wells and ITO electrodes. The negatively charged nucleotides can be directed towards the DNA beads by applying a potential difference across these electrodes.

Unless defined otherwise, all technical and scientific terms used herein have the same meaning as commonly understood by those of ordinary skill in the art to which this invention belongs. Although any methods and materials similar or equivalent to those described herein can be used in the practice or testing of the present invention, the preferred methods and materials are described. Generally, nomenclatures utilized in connection with biochemistry and biophysics as used here are those well known and commonly used in the art. Certain experimental techniques, not specifically defined, are generally performed according to conventional methods well known in the art and as described in various general and more specific references that are cited and discussed throughout the present specification. For the purposes of clarity, the following terms are defined below.

The term "microfluidic device" is used in a conventional sense, it being understood that the present device is preferred for use and is advantageous with small reaction volumes and liquid flow rates. In general, the reaction wells should be no larger than 100 nL and may be as small as 1 pL. In a preferred embodiment described below, they are 35 μm in diameter. The device will include liquid flow channels for flowing buffer and reactants into the reaction wells. The reaction wells may be sized to hold a single charged bead. The reaction wells are generally any defined space where reactants are brought together and are located out of the direct flow of the fluid channel unless the device is configured to direct the reactants into the reaction area, or out of the reaction area, by charging the electrodes to provide a field attracting or repelling the charged species into or out of the well.

The term "transverse" is used in a general sense to mean crosswise, preferably, but not necessarily, perpendicular.

The term "electric field" is used to mean the effect produced by the existence of an electric charge, such as an electron, ion, or proton, in the volume of space or medium that surrounds it. Each of a distribution of charges contributes to the whole field at a point on the basis of superposition. A charge placed in the volume of space or in the surrounding medium has a force exerted on it. Electric fields are created by differences in voltage: the higher the voltage, the stronger will be the resultant field. In contrast, magnetic fields are created when electric current flows: the greater the current, the stronger the magnetic field. An electric field will exist even when there is no current flowing. Electric fields are measured in Volts per meter (V/m). In order to cause movement of the charged particles in the present methods and device, within a convenient time frame, the electric field strength should be about 5 V/cm or higher, up to practical limits of Joule heating and dielectric breakdown limits, with the maximum upper value being about 1000 V/cm As an example of a high strength electric field, it is noted that water, being dipolar, can be partly aligned by an electric field and this may be easily shown by the movement of a stream of water by an electrostatic source. Very high field strengths ($5 \times 10^9$ V m$^{-1}$) reorient water in ice such that freezing is inhibited.

General Method and Apparatus

Described below are apparatus and methods for electric field directed concentration and washing of charged molecules.

Previous electrophoretic concentration techniques have relied on faradaic current to concentrate the charged species at the electrode site. This typically results in electrolytic reactions occurring at the electrodes and generation of electrolysis products such as oxygen and hydrogen. The present method uses a displacement field through capacitive coupling of the electrodes rather than faradaic current through the electrodes.

The electric field used herein is based on accepted principles of capacitance. When two plates of different charge are placed near each other, as in a parallel plate capacitor, the two E-fields between the plates add while the E-fields outside the plates cancel. When the plates are close to each other to form a capacitor, the E-field between the plates is constant throughout the interior of the capacitor as long as one is not near the edges of the plates. Since the electric field is the negative of the gradient of the potential and the E-field is constant inside a capacitor, the magnitude of the electric field E has a very simple relation to the voltage V between the plates and their separation d.

$$E = \frac{V}{d} \quad \text{Equation 1}$$

By placing a thin insulating material (a dielectric) between the plates the separation d can be reduced thus increasing the capacitance of the capacitor and preventing the plates from touching.

Displacement current is a quantity related to a changing electric field. It occurs in dielectric materials and also in free space.

The displacement current is mathematically defined by the rate of change of the electric displacement field, (a known physics term, also called electrical field/flux density) D:

$$J_D = \frac{\partial D}{\partial t} = \varepsilon \frac{\partial E}{\partial t} \quad \text{Equation 2}$$

where D=∈E, where the permittivity ∈=∈$_0$ ∈$_r$, and where ∈$_r$ is the relative permittivity of the dielectric and ∈$_0$ is the permittivity of free space (8.854 E-12 Fm$^{-1}$).

In the present device, in response to the applied DC voltage across the electrodes, electric double layers are created at the electrodes that shield the voltage applied at the electrodes. Hence, a DC voltage across the electrodes does not result in an electric field in the bulk of the channel due to shielding by electric double layers, and faradaic current is necessary to achieve concentration. However, if the voltage across the electrodes is switched at a time scale faster than the time taken by ions to form the double layers, the effect of shielding becomes negligible and an electric field exists across the entire channel width. The AC frequency required for a typical case of 10 mM ionic strength electrolyte with 10 nm thick dielectric layer and gap between electrodes of ~100 µm is ~100 kHz. The present method uses alternating fields, changing at frequency ~500 kHz or higher, with a net DC bias to achieve a net electric field across the electrodes without any faradaic current.

If one were to apply across the fluid flow channel a DC voltage by itself, the voltage near one surface of the channel would be shielded by an electric double layer within about 10 nm from the channel wall. The electric field would thus be largely zero throughout the remaining width of the channel (beyond ~10 nm from that wall). If one were to apply only AC voltage, which is switched faster than the response time of the ions (~0.1 ms), the effect of the electric field would be applied equally across the entire channel. However, the average electric field would still be zero. In the case of both DC and AC voltage, there is a time averaged DC field across the entire channel, resulting in a force E, which is high at one side of the channel and decreases with the distance from that side.

By way of further explanation, it may be said (without wishing to be bound by any theory) that the present methods and devices employ a particular type of electrokinesis. Electrokinesis refers to a class of phenomena elicited by the action of an electric field on the mobile ions surrounding charged objects in an electrolyte solution. When an object of given surface charge is immersed in a solution containing ions, a diffuse ion cloud forms to screen the object's surface charge. This arrangement of a screening cloud of (immobile) charges associated with an immersed object and a layer of (mobile) counterions in solution is referred to as a "double layer". In this region of small but finite thickness, the fluid is not electroneutral. Consequently, electric fields acting on this region will set in motion ions in the diffuse layer, and these will in turn entrain the surrounding fluid. The resulting flow fields reflect the spatial distribution of ionic current in the fluid. Electroosmosis represents the simplest example of an electrokinetic phenomenon. It arises when an electric field is applied parallel to the surface of a sample container or electrode exhibiting fixed surface charges, as in the case of a silicon oxide electrode (in the range of neutral pH). As counterions in the electrode double layer are accelerated by the electric field, they drag along solvent molecules and set up bulk fluid flow. This effect can be very substantial in narrow capillaries and may be used to advantage to devise fluid pumping systems.

Electrophoresis is a related phenomenon, which refers to the field-induced transport of charged particles immersed in an electrolyte. As with electroosmosis, an electric field accelerates mobile ions in the double layer of the particle. If, in contrast to the earlier case, the particle itself is mobile, it will compensate for this field-induced motion of ions (and the resulting ionic current) by moving in the opposite direction. Electrophoresis generally is carried out in a gel or medium with a solid mesh, which will retard the ionic particles according to a certain basis, e.g., size. As described below, it is contemplated here that the particles will be in a liquid fluid without impeding gels or solid phase.

Referring now to FIG. 1, there is illustrated a microfluidic device having wells 100 defined in a layer of SU-8 photoresist 110, which device further comprises an electrode 112 spaced above the layer 110 and extending between the wells so as to define a fluid flow channel (as shown at 116) between the electrode 112 and the photoresist layer 110 and communicating with the wells. The fluid channel is preferably on the order of 100 µm deep, in that the present device is particularly well suited for 10 µL volumes. The layer 110 is a well forming layer (i.e., a layer patterned to define at least a part of the reaction areas and a fluid flow channel). The layer is defined from photoresist for ease of fabrication at a submicron scale. It is preferred that a high aspect ratio (e.g., d/w>5:1) be achieved in the well. In other words, the reaction area or well is offset from the channel (by the etching) to a certain depth and is a cavity of a certain (relatively narrow) width or diameter. Beads may flow through the fluid flow channel and into wells. A second electrode 114 is under the well forming layer 110 to define a bottom portion of a well. Where wells have been formed (etched or molded) in the layer, the electrode is exposed to the fluid and materials in the well, which enters the device as shown at arrow 116. Electrodes 112 and 114 are preferably formed of ITO (indium tin oxide) approximately 100 nm thick. As further shown in FIG. 1, these electrodes form essentially parallel sheets, with the fluid channel and the wells in between.

Figure 2A:
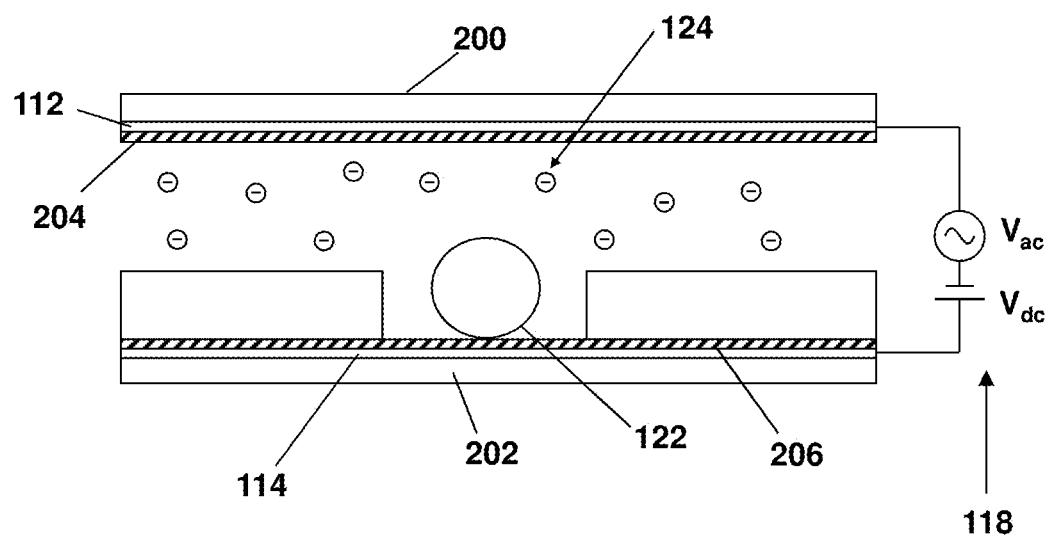
FIGS. 2A and 2B are schematics of the setup for concentrating or removing nucleotides (or other charged molecules) near the DNA bead (or other target sites), with an alternative electrode arrangement shown in FIG. 2B.

It is important to note that a dielectric layer made of silicon oxide or parylene or silicon nitride of ~100 nm thickness is applied to the electrodes, e.g., above the ITO layer, as shown in FIG. 2 (204 and 206). Further as shown in FIG. 1 and FIGS. 2A and B, a voltage source 118 (FIG. 1) connects the electrodes and is charged such that, as will be described in detail below, the top electrode 112 is negative and the bottom electrode 114 (at the bottom of the wells) is positive, in order to drive particles (atoms, molecules, beads, etc.) into the wells. The terms "top" and "bottom" are used here for convenience, and the device may be configured in various orientations with regard to gravity or orientation in use.

Referring again to FIG. 1, the top electrode 112 is applied to a substrate 120, which is made e.g., of borosilicate glass or quartz and is spaced above the well forming layer 110 by any etched or machined structure, such as a step in the photoresist layer.

In an exemplary method, beads 122 containing DNA molecules bound to the surface and extending outwardly are shown as being contained in the wells 100 (one bead per well). Oligonucleotides are attached to the beads as is known in the art (see related patents and publications). The beads have been delivered to the well area by fluid flow 116 and assisted in entering wells by the electric field achieved by electrodes 112 and 114 above and below the well, or by magnets. An electric field is applied to drive negatively charged molecules such as shown at 124 towards the beads and into the well. The molecules may be nucleotides, enzymes, or other charged species. The molecules are delivered in a suitable buffer and cause a detectible reaction with the DNA strands on the beads. Low concentration (~10 mM) Tris-Acetate or Tris HCl are preferred for use as the buffer.

In one embodiment, the charged molecules are nucleotides which are incorporated into a polynucleotide and generate, in the reaction area, inorganic phosphorous, which is used to generate a detectible light signal (e.g., pyrosequencing). Accordingly, a fiber optic faceplate 126 is attached to a thin, transparent electrode 114, which, with any dielectric coating, forms the bottom of the reaction area. The electrode is transparent to the light to be collected. The fiber optic faceplate 126 may be from a commercially available source, e.g., Schott North America, Inc. The fiber optic faceplate is composed of a bundle of fused fibers aligned in parallel and perpendicular to the bottom surface of well 100. In this way, light is efficiently transmitted from each individual well 100 to a light sensor, such as a CMOS sensor 128 coupled to the fiber optic faceplate with sensing areas under each well. As is known, CMOS, which stands for Complementary Metal Oxide Semiconductor, imagers include an array of photosensitive diodes, one diode within each pixel. Unlike CCDs, however, each pixel in a CMOS imager has its own individual amplifier integrated inside. Since each pixel has its own amplifier, the pixel is referred to as an "active pixel". The shaded areas in CMOS detector 128 are aligned with individual wells and receive the maximum light from that well, and only light from that well. Each well is coupled to an individual CMOS detector element.

To take advantage of the full capacity of the CMOS pixels and achieve the best possible coverage, which is essential for improving system throughput, the device is constructed with a near perfect alignment of the wells 100 with the CMOS sensor pixels. This, however, cannot be achieved with alignment of the fibers in the faceplate with the pixels because of the irregularities of the patterns in available fiber faceplates. The most convenient way to avoid direct alignment is to use optical fibers, which are much smaller in dimension as compared to the wells and the CMOS pixels. Using such a faceplate circumvents the problem of alignment of the faceplate to the pixel and wells. The pixel and the wells, however, do need to be aligned. This can very easily be done by fixing the image sensor position and using two micrometer adjusters in the X and Y dimensions to get perfect alignment of the microfluidic platform containing the wells. This process can either be done by hand or through a more complicated stepper motor mechanism. The calibration metric used to detect perfect alignment can be set as the amount of collective photocharge across the entire image sensor area in presence of a calibrated amount of ATP or PPi assay before each run. If not well aligned, the light signal can be lost on the area between the individual CMOS pixels, but as alignment gets better, the lost photon flux diminishes. Maximum light intensity indicates perfect alignment. Automatic adjustment of the microfluidic and CMOS sensor plates can be achieved through application of piezoelectric actuation. In this technique, the microfluidic plate holder will be equipped with a single or multiple piezoelectric actuators. Once the plate is inserted in the holder, the piezoelectric actuator can be activated with a feedback from the CMOS output to move the plate to a single position each time. Our calculations indicate that 2N of force should be sufficient for moving the plates toward alignment. Piezoelectric actuators capable of such forces are commercially available. It has also been shown that alignment within µms can be achieved using such a technique. The best position for the wells, in terms of light efficiency, would be as close to the faceplate as possible. Therefore our wells are fabricated right on top of the faceplate through deposition and patterning a layer of SU-8 on top of the faceplate. Based on our simulations, the optical efficiency can be greatly improved by this direct coupling from 1.6% to more than 90%.

A schematic drawing further showing aspects of the present device and technique is shown in FIG. 2A. In this embodiment, there is shown an indium tin oxide (ITO) electrode material coated (~150 nm thick) (112 and 114, as in FIG. 1) onto standard glass slides 200, 202 to apply the electric field in the channel, traverse to the direction of flow. The transparent ITO electrodes are further coated with a thin layer (~20 nm) of dielectric 204, 206 such as Parylene or silicon oxide or silicon nitride (shown as patterned in FIG. 2) to prevent corrosion of the electrode due to electrolysis and to facilitate the electric displacement field. Thus, the fluid channel has one surface coated with a dielectric layer, which is in contact with the fluid, and an opposing surface, bearing electrode portions, where the electrode portions are also coated with a dielectric layer. Parylene is a generic term applied to the family of unsubstituted and substituted. Parylene N and SCS Parylene HT have particularly high dielectric strength, and a dielectric constant independent of frequency, and may be preferred. Further description of Parylene dielectric materials is found in U.S. Pat. No. 4,163,828 to Mahoney, issued Aug. 7, 1979, entitled "Parylene stabilization."

Figure 2B:
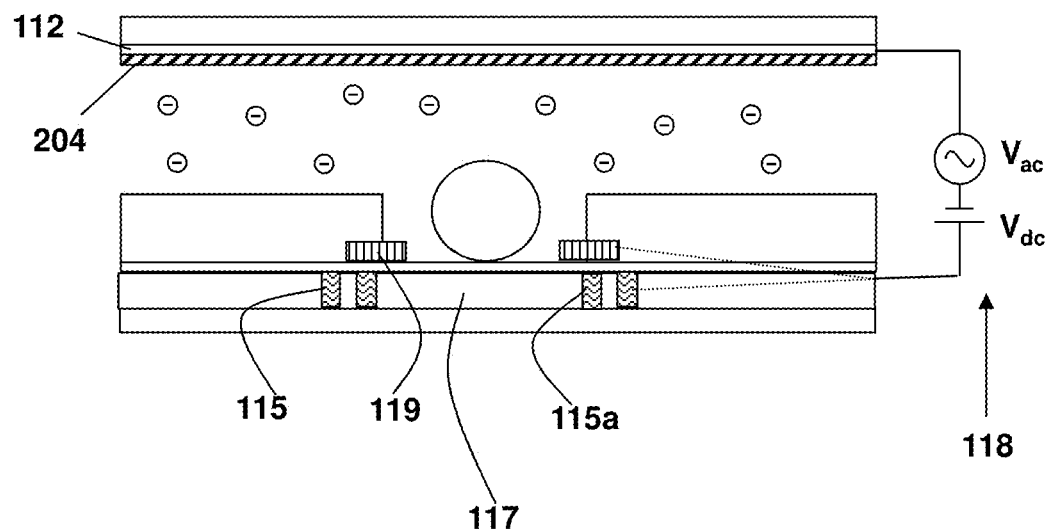

In FIG. 2B a variation of an electrode array is shown. In this embodiment, a glass layer such as shown at 202 in FIG. 2A is adapted for a CMOS fabrication process in which a CMOS sensor is placed directly below the well and under a transparent layer 117. The well electrodes are preferably coated by a dielectric layer (not shown), but are formed out of one or both of a series of wires 115, 115a, or electrode strips 119 under the well forming layer, and along the sides of the well, at the bottom portion. In top view, the wires and electrodes would be in the form of a grid, forming a square around each well, at the bottom portion, near the sensor. This would allow the fabrication of wells with electrodes on the order of size of CMOS sensor pixels. If each well (pixel) was 20 μM square, for example, a single or double wire, with a wire diameter of about 1 μM can be used to create a grid and pulsed to provide an AC and DC charge. The wires run adjacent to the bottom of the well. Also, an electrode can be placed within the side wall of the well, extending partially into the bottom of the well, as shown at 115 and 115a. Again, if one considers a "pixel" to be a portion of the bottom of the well, which is in optical contact with a sensor, the pixel is bounded on four sides by an electrode, in this case, a set of metal strips, where each strip is mostly within the sidewall of the well, but extends somewhat into the bottom of the well. These metal wires 115 and metal strips 119 are connected to the voltage source and operated as described above.

The flow structure containing the flow channel and the wells for DNA beads is fabricated in SU-8 (~200 μm thick). PDMS/silicone gaskets can also be used to create the flow channels. The ITO-dielectric coated glass slides form the top and the bottom layer of the flow channel. As described in connection with FIG. 1, a bead 122 is in a well in a fluid medium containing charged particles 124, and a voltage source connects the electrodes so as to cause movement of the particles towards or away from the well and the bead 122 in the well, the bead having attached to it reactants such as oligonucleotides for reaction with nucleotides 124.

Conventional photolithography techniques can be applied for SU-8 patterning. Such fabrication processes for SU-8 have already been tested and verified at the Stanford nano-fabrication facility. The SU-8 processing allows fabrication of high aspect-ratio wells, which is critical for reducing chemical crosstalk between adjacent beads. That is, the reaction area should completely contain the bead.

Given the above description of the preferred embodiment of the present device, it will be apparent that a variety of alternative constructions are possible. Although not illustrated, it can be envisioned that in one embodiment, each well may be coupled to an individually controlled electrode pair, and different wells may be in different states of charged species attraction or repulsion at the same time.

The electrodes may be made of a variety of transparent electrically-conductive layers, such as metal oxides such as indium tin oxide (ITO), antimony doped tin oxide, and cadmium stannate (cadmium tin oxide), each of which is commonly used as transparent electrodes in electro-optical devices such as liquid crystal displays. The electrodes are transparent for purposes of optical detection. In devices where the reaction is measured thermally or electrically, the electrodes do not need to be transparent. For example, the device may be used for electrical detection of a binding reaction. See, U.S. Pat. No. 5,284,748 to Mroczkowski, et al. Feb. 8, 1994, entitled "Method for electrical detection of a binding reaction." A voltametric immunoassay can be carried out by labeling one immunoreactant with an electroactive substance. Pace U.S. Pat. No. 4,233,144, issued Nov. 11, 1980, is illustrative of one such technique. Another method involves sandwiching an antigen-antibody layer between two conductive layers and measuring the electrical capacitance of the resulting laminate. Giaever U.S. Pat. No. 4,054,646, issued Oct. 18, 1977, describes such a method. A further type of capacitance-measuring system includes a pair of electrodes coated with a substrate and immersed in a medium containing a material which specifically binds with the substrate, as described in Arwin U.S. Pat. No. 4,072,576.

The well-forming layer may be formed of any inert material. Photolithographic techniques may be employed to pattern the layer into a series of fluid channels and reaction areas, for example as described in U.S. Pat. No. 6,960,437 to Enzelberger, et al., issued Nov. 1, 2005, entitled "Nucleic acid amplification utilizing microfluidic devices." As described there, microfluidic devices are constructed at least in part from elastomeric materials and constructed by single and multilayer soft lithography (MLSL) techniques and/or sacrificial-layer encapsulation methods (see, e.g., Unger et al. (2000) Science 288:113-116, and PCT Publication WO 01/01025) Utilizing such methods, microfluidic devices can be designed in which solution flow through flow channels of the device is controlled, at least in part, with one or more control channels that are separated from the flow channel by an elastomeric membrane or segment. More specifically, certain fabrication methods involve initially fabricating mother molds for top layers (elastomeric layer with the control channels) and bottom layers (elastomeric layer with the flow channel) on silicon wafers by photolithography with photoresist (Shipley SJR 5740). Channel heights can be controlled precisely by the spin coating rate. Photoresist channels are formed by exposing the photoresist to UV light followed by development. Heat reflow process and protection treatment is performed as described previously (M. A. Unger, H.-P. Chou, T. Throsen, A. Scherer and S. R. Quake, Science 288, 113 (2000)).

The photoresist material may be spin or spray-coated onto a substrate such as a silicon wafer or applied as a film or web to the wafer. Commercially available dry film photoresist materials include acrylic based materials, such as a material available from Mitsui of Japan under the trade name Ordyl PR132, epoxy based materials, such as a material available from E. I. DuPont de Nemours and Company Corporation of Wilmington, Del. under the trade name RISTON, or a material available from MicroChem Corporation of Newton, Mass. under the trade name SU-8, (or such as a proprietary material internally used at Lexmark International, Inc. of Lexington, Ky. and referred to internally as GSP920), and polyimide-based photoresist materials, such as a material available from HD Microsystems of Parlin, N.J. under the trade name HD4000.

After applying the photoresist material to the fluid side of a wafer substrate, the photoresist material is exposed, as through a mask, to actinic radiation, such as ultraviolet (UV) light to pattern the photoresist material to provide locations for fluid flow channels in the photoresist material upon developing the photoresist material. The patterned photoresist material is then developed by dissolving uncured material from the fluid channel/well areas of the wafer using a developing chemical. The developing chemicals may be selected from tetramethyl ammonium hydroxide, xylene or aliphatic hydrocarbons, sodium carbonate, and 2-butyl cellosolve acetate (BCA). For further details, see U.S. Pat. No. 7,043,838 to Smoot, et al., issued May 16, 2006, entitled "Process for manufacturing a micro-fluid ejection device."

A general assay protocol for nucleotide preconcentration/washing is as follows:

1. The flow channel is first filled with the DNA beads.
2. The flow channel is sealed from the top with the ITO-dielectric glass slide.
3. The flow channel is subsequently filled with the solution containing the nucleotides.
4. The ITO electrodes are connected to a high frequency AC source and a high frequency square pulse (Vpeak ~5-7 V.>100 kHz) is applied across the channel. That is, the voltage source 118 provides an AC field to electrodes 112, 114, electrode 114 being effective only in well bottoms. The AC field is in the range of 2 to 20 volts, preferably 5 to 7 V, and at a frequency preferably greater than 100 kHz, in a range of about 10 kHz to about 10 MHz.
   This high frequency AC field nullifies the effect of the electric double layer that forms at the electrode-liquid interface. In the absence of the AC field, the electric double layer would shield the DC voltage applied across the electrodes and there would be no DC electric field inside the channel.
5. A small DC voltage (~1.5 V) is superimposed on the existing AC voltage, again from voltage source 118. Depending on the polarity of the DC field, the nucleotides either concentrate near the DNA beads or are repelled away from the DNA beads in the wells.

The present device may be used for a wide variety of assays. Preferred assays include those that involve transport of nucleotides. These include:

Primer Elongation/Degradation Assay

In this assay, terminal transferase activity is detected in protein preparations by incorporation of dATP into ssDNA. A typical procedure involves: 130 nM TdTS or 130 nM TdTL is incubated at 35° C. in 200 nM potassium cacodylate, 25 mM Tris-HCl, pH 6.6, 0.25 mg/ml BSA, 4 mM MgCl2, 4 µM ZnSO4, 5% glycerol, 1 mM dATP, and 20 nM 5'-32P-labeled (dA)10 primer. The 3'5' exonuclease activity in protein preparations are searched using the same assay in the absence of dATP. Aliquots are withdrawn at 0, 5, 15, 30, and 60 min, supplemented with a formamide dye mix, and electrophoresed on a 16% acrylamide denaturing gel. Products are visualized after exposure of the wet gel under a Kodak film (Biomax MR) at −70° C. See The Journal of Immunology, 2004, 172: 6764-6767. "Evidence That the Long Murine Terminal Deoxynucleotidyltransferase Isoform Plays No Role in the Control of V(D)J Junctional Diversity."

Clonal Analysis of DNA, or Multiplex Analysis

This assay uses a device having a plurality of reaction areas, where each reaction area is a well designed to hold one, and only one, bead. DNA molecules are attached to neutrally charged beads using methods known in the art, with one species of DNA for each bead. Examples of neutral materials that may be used for the bead include glass, polyacrylamide, polystyrene, Sepharose® beads (crosslinked polysaccharide agarose, trademark of GE Healthcare. Properties), other forms of agarose, latex, etc. In addition, magnetic beads may be used, as illustrated in Example 3. Because the process of attaching DNA or other molecules is imperfect, this will result in two populations of beads, one population with DNA, and one population without DNA. Both populations are put in the flow channel, and an AC field with DC bias is applied to the wells. Because DNA is negatively charged, this will result in DNA-containing beads being captured in the wells, with naked beads flowing through such that they are washed away. This results in an enriched population of DNA-coated beads in the device. The DNA on the beads may then be amplified, using techniques known in the art. The DNA-coated beads may be a variety of known bead materials and connected directly to oligonucleotides or polynucleotides of DNA (or RNA), which are then processed further, either by acting as sequencing templates, by acting as probes for the attachment of other polynucleotides, or the like. The beads may be coated with streptavidin and attached to biotinylated DNA/RNA, or configured in a wide variety of ways known to those in the art.

In one aspect of this embodiment, the beads are coded with a barcode. A bar code is a specific tag that is used to uniquely detect a molecule. The bar code may be any type of bar code known in the art, including but not limited to optical tags, fluorescent tags, electrically responsive tags, and a set of tags with different masses. The bar codes are decoded using a method that depends on the type of barcode, including but not limited to mass, electrical, visual, fluorescence, and nucleic acid detection. In this way, the sequence of DNA in each reaction area can be identified.

Figure 5A:
FIGS. 5A and 5B are photographs showing fluorescent dye unconcentrated (5A) and concentrated (5B) by an electric field.

Thus, this method allows for introduction into the flow channel of a population of beads, only some of which contain molecules to be analyzed (e.g., DNA), wherein the beads containing molecules contain different molecular species (e.g., different DNA sequences, different proteins or the like). The beads are put randomly into wells, and identified by bar coding. The molecules need only be responsive to the present E-field. As shown in FIG. 5, even certain dyes are responsive, as well as proteins and nucleic acids (DNA, RNA).

Multiplex analysis is carried out in a number of wells, which may be on the order of hundreds or thousands of different wells. One may address each well (or a subset of wells) with a different fluid channel. Once the target molecules are directed into individual wells, reactants are specifically addressed to those molecules for chemical analysis. The results are read as described above, and analysis may further includes deconvoluting a bar code to identify the target molecule. The term "bar code" is used here loosely to refer to a unique molecule (such as an oligonucleotide or magnetic particle) that is associated with the target molecule, either directly or through a solid support such as a bead. Further details may be found, e.g., in U.S. Pat. No. 6,261,782 to Lizardi, et al., issued Jul. 17, 2001, entitled, "Fixed address analysis of sequence tags." Other labels that can be used according to the present method include molecular or metal barcodes, mass labels, and labels detectable by nuclear magnetic resonance, electron paramagnetic resonance, surface enhanced raman scattering, surface plasmon resonance, fluorescence, phosphorescence, chemiluminescence, resonance raman, microwave, or a combination. Mass labels are compounds or moieties that have, or which give the labeled component, a distinctive mass signature in mass spectroscopy. Mass labels are useful when mass spectroscopy is used for detection. Preferred mass labels are peptide nucleic acids and carbohydrates. Combinations of labels can also be useful. For example, color-encoded microbeads having, for example, 265 unique combinations of labels, are useful for distinguishing numerous components. For example, 256 different ligator-detectors can be uniquely labeled and detected allowing multiplexing and automation of the disclosed method.

Polymerase Chain Reaction

This standard assay detects the presence of a defined sequence in a DNA molecule, which is complementary to a pair of oligonucleotide primers. By adding heating elements, PCR reactions may be carried out in a device such as illustrated in FIG. 1. PCR is described, for example in basic patents such as U.S. Pat. Nos. 4,683,202; 4,683,195; 4,800,159; and 4,965,188. U.S. Pat. No. 5,512,462 to Cheng, issued Apr. 30, 1996, entitled "Methods and reagents for the polymerase chain reaction amplification of long DNA sequences," describes methods and reagents for the amplification of DNA sequences longer than 10 kilobases by the polymerase chain reaction (PCR). The methods use compositions consisting of a primary thermostable DNA polymerase from *Thermus thermophilus* combined with a lesser amount of a secondary thermostable DNA polymerase possessing a 3'-to-5' exonuclease activity from *Thermococcus litoralis, Pyrococcus* species GB-D or *Thermotoga maritime*.

The present methods may also be applied to various methods of DNA sequencing-by-synthesis.

Pyrosequencing

The pyrophosphate method described here is a type of sequencing by synthesis See Ronaghi et al., "A Sequencing Method Based on Real-Time Pyrophosphate," *Science,* 281: 363 365 (1998) and Hyman, "A New Method of Sequencing DNA," *Anal. Biochem.,* 174: 423 436 (1988).

As described in Ronaghi, "Pyrosequencing Sheds Light on DNA Sequencing," Genome Research Vol. 11, Issue 1, 3-11, January 2001, pyrosequencing is a DNA sequencing technique that is based on the detection of released pyrophosphate (PPi) during DNA synthesis. In a cascade of enzymatic reactions, visible light is generated that is proportional to the number of incorporated nucleotides. The cascade starts with a nucleic acid polymerization reaction in which inorganic PPi is released as a result of nucleotide incorporation by polymerase. The released PPi is subsequently converted to ATP by ATP sulfurylase, which provides the energy to luciferase to oxidize luciferin and generate light. Because the added nucleotide is known, the sequence of the template can be determined. The nucleic acid molecule can be either RNA or DNA. However, because DNA polymerases show higher catalytic activity than RNA polymerases for limited nucleotide extension, efforts have been focused on the use of a primed DNA template for pyrosequencing. Standard pyrosequencing uses the Klenow fragment of *Escherichia coli* DNA Pol I, which is a relatively slow polymerase. The ATP sulfurylase used in pyrosequencing is a recombinant version from the yeast *Saccharomyces cerevisiae* and the luciferase is from the American firefly *Photinus pyralis*. The overall reaction from polymerization to light detection takes place within 3-4 sec at room temperature. One pmol of DNA in a pyrosequencing reaction yields $6 \times 10^{11}$ ATP molecules, which, in turn, generate more than $6 \times 10^9$ photons at a wavelength of 560 nanometers. This amount of light is easily detected by a photodiode, photomultiplier tube, or a charge-coupled device (CCD) camera. There are two different pyrosequencing strategies: solid-phase pyrosequencing (Ronaghi et al. 1996) and liquid-phase pyrosequencing. Solid-phase pyrosequencing utilizes immobilized DNA in the three-enzyme system described previously. In this system a washing step is performed to remove the excess substrate after each nucleotide addition. In liquid-phase pyrosequencing apyrase, a nucleotide-degrading enzyme from potato, is introduced to make a four-enzyme system. Addition of this enzyme eliminates the need for solid support and intermediate washing thereby enabling the pyrosequencing reaction to be performed in a single tube.

While being advantageous in using native nucleotides, the pyrophosphate method requires synchronization of polymerases on the DNA strands, which has been known to restrict sequence read lengths. Also, it is not expected that the detection method can approach single molecule sensitivity due to limited quantum efficiency of light production by luciferase in the procedure. Furthermore, the overall sequencing speed is limited by the necessary washing steps, subsequent chemical steps in order to identify pyrophosphate presence, and by the inherent time required to test each base pair to be sequenced with all the four bases sequentially. Also, difficulties in accurately determining homonucleotide stretches in the sequences were recognized.

The present methods using electrokinesis of DNA, nucleotides, PPi and the enzymes listed above provide significant improvements in pyrosequencing. The reactants flow into the wells better, addressing the above-listed potentially problematic areas of synchronization, read lengths, and speed.

Primer Extension

As described in U.S. Pat. No. 6,613,513 to Parce, et al., issued Sep. 2, 2003, entitled "Sequencing by incorporation," methods of sequencing by synthesis or incorporation generally all involve the addition of nucleotides or nucleotide analogs to reaction mixtures comprising nucleic acid templates and primers, e.g., DNA or RNA. The nucleotides are incorporated into the primer, resulting in an extended primer. The sequence is determined as each additional complementary nucleotide is incorporated into the primer and the steps are repeated until the entire template sequence or a portion thereof is determined.

In one embodiment of this method, the nucleotides or nucleotide analogs, or a fraction thereof, comprise a 3'-blocking group and a detectable label moiety, which typically comprises a phosphate or a carbamate group. The 3'-blocking groups provide reversible chain termination. When added to a growing nucleic acid chain, these nucleotide analogs result in a non-extendable primer. The 3'-blocking group is typically removed, e.g., by a reducing agent and/or a phosphatase, to produce an extendable primer to which further nucleotides are added, thereby allowing continued sequencing of the nucleic acid template. Removal of the 3'-blocking group is optionally performed before or after detection of the added nucleotide.

In another embodiment of this method, the nucleotides or nucleotide analogs comprise a fluorescent label. Sequencing by synthesis using fluorescent nucleotides typically involves photobleaching the fluorescent label after detecting an added nucleotide. Photobleaching comprises applying a light pulse that destroys or reduces to an acceptable level, e.g., a background level or to a low enough level to prevent signal buildup over several sequencing cycles, the fluorescence of the nucleotides, e.g., a fluorescent nucleotide that has been added to the primer.

Related methods using dyes or fluorescent labels associated with the terminal nucleotide have been developed, where sequence determination is also made by gel electrophoresis and automated fluorescence detectors. For example, the Sanger-extension method has recently been modified for use in an automated micro-sequencing system, which requires only sub-microliter volumes of reagents and dye-labeled dideoxyribonucleotide triphosphates. In U.S. Pat. No. 5,846,727 to Soper et al., fluorescence detection is performed on-chip with one single-mode optical fiber carrying the excitation light to the capillary channel, and a second single-mode optical fiber collecting the fluorescent photons. Sequence reads are estimated in the range of 400 to 500 bases which is not a significant improvement over the amount of sequence information obtained with traditional Sanger or Maxam-Gilbert methods. Furthermore, the Soper method requires PCR amplification of template DNA, and purification and gel electrophoresis of the oligonucleotide sequencing "ladders" prior to initiation of the separation reaction. These systems all require significant quantities of target DNA. Even the method described in U.S. Pat. No. 5,302,509 to Cheeseman, which does not use gel electrophoresis for sequence determination, requires at least a million DNA molecules.

In addition, the present electric field apparatus may be adapted to assays involving contacts between proteins and other proteins or proteins and small molecules. For example, an immobilized enzyme may be contacted with substrate (with or without inhibitor) whereby the substrate and any inhibitor are present as charged particles in a solution. Applying the e-field moves the reactants towards the enzyme to shorten process times. Similarly, immunoassay formats using a capture antibody fixed on a microtiter plate may be designed according to the disclosed methods in order to improve flow of charge reagents (antigen, labeling antibody) to and from the capture antibody.

EXAMPLES

Example 1

Concentration of Beads into Electrode Wells

Figures 3A, 3B:
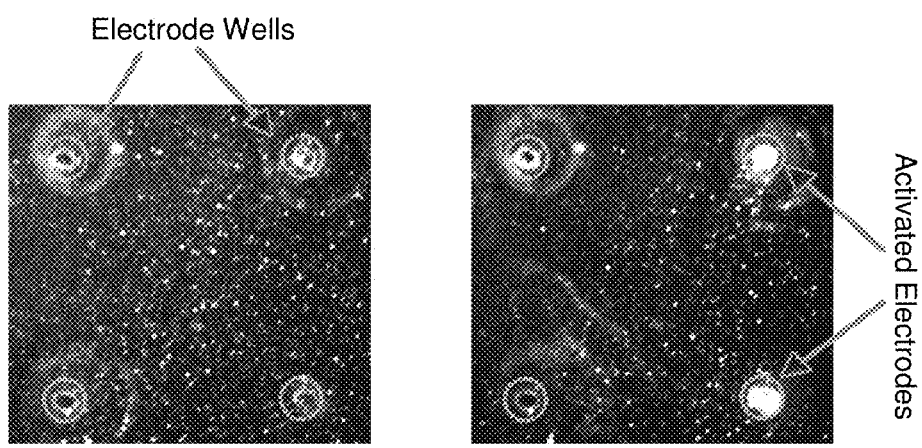
FIGS. 3A and 3B are photographs showing electric field assisted trapping of 1 μm beads inside 50 μm wells. Out of the 4 electrodes shown in the image, voltage is off (3A) then applied (3B) at 2 electrodes and stacking of particles is observed at these sites.

In this example, the electric field assisted trapping of 1 μm fluorescent polystyrene beads inside 50 μm wells is illustrated. As shown in FIG. 3, four electrode wells were prepared. The wells were created using 150 μm thick Mylar sheets with adhesive on one side. The electrodes were fabricated on a printed circuit board and each electrode could be individually activated by applying a voltage across the electrode and bulk solution. An 80 μm thick current conducting Nafion membrane formed the bottom of the well and isolated the electrodes from the solution containing the beads.

A multi-output computer controlled power supply (Labsmith, HVS 3000D) was used to individually activate an electrode. An upright Nikon epifluorescent microscope was used for imaging. The bead solution was prepared by 10,000× dilution of the stock solution in 10 mM Tris-HEPES buffer. The bead solution was then filled in the 3 cm long and 5 mm wide flow chamber over the electrodes. A nominal DC electric field of ~75 V/cm was applied across the electrode and the bulk solution and the beads were consequently trapped inside the well in less than 10 sec. Voltage was applied at only two of the four electrodes and stacking of particles is observed on the Nafion membrane at these activated electrode sites. In this embodiment, there is a DC current that directs the beads to the membrane inside the well. In the embodiments described below, there is a dielectric layer on the electrodes that prevents these DC currents. Therefore, those experiments require displacement currents from combination of AC and DC voltages.

Example 2

Electric Field Directed Preconcentration of Fluorescent Species

Figure 4A:
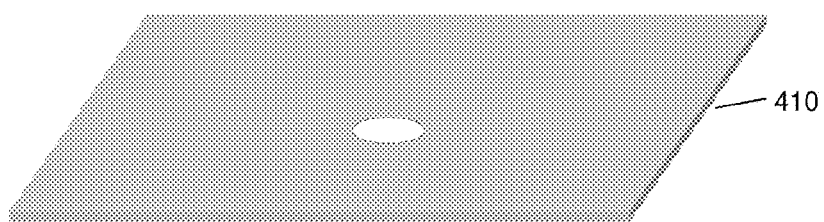
FIGS. 4A and 4B is a schematic drawing (perspective view in 4A and side view in 4B) of an experimental device used to show concentration of fluorescent dye in an electric field.
Figure 4A:
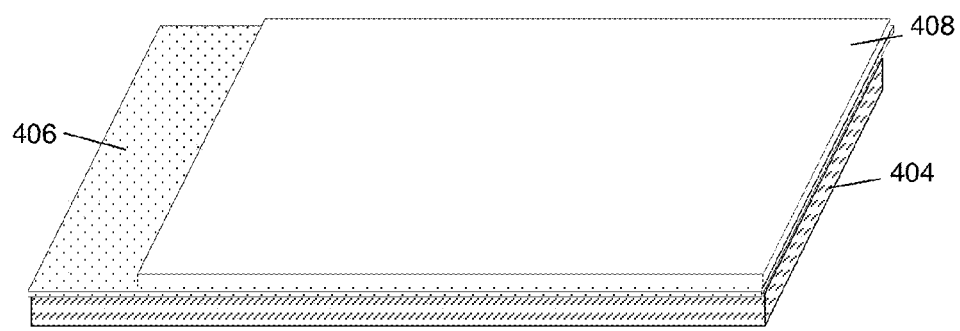
Figure 4B:
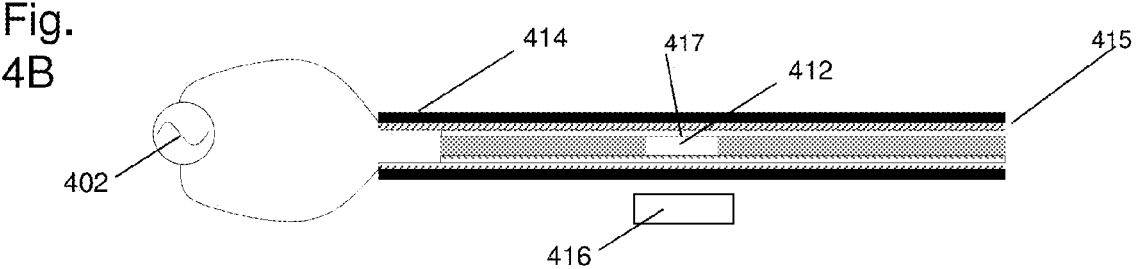

Referring now to FIG. 4, a prototype device for showing electric field directed movement of charged molecules is illustrated. The device comprises a sheet of a 250 μM thick silicone gasket material 410 having a 1 mm diameter hole in the sheet. This is applied to a 20 nm parylene dielectric layer 408 which had been applied to a 150 nm ITO layer 406 on a 1 in.×3 in glass slide 404, forming a "bottom." To form a "top," another glass slide 414 was similarly coated with an ITO layer 415 to form an electrode and a parylene layer 417 on the "bottom" side of the top electrode in contact with fluid, which can be contained in a well 412 formed when the two slides were sandwiched together.

A Coolsnap fx-16 CCD camera, Olympus IX70 epifluorescent microscope imaging device 416 was arrayed beneath the fluid well. Conductive copper tape was used to connect the electrodes to the signal generator.

10 mM Tris-HCl solution with 500 nM Alexa-Fluor 488 fluorescent dye (Molecular Probes) was placed in the well according to the following procedure: The conductive copper tape was attached to the exposed ITO layer on the glass slides. The silicone gasket was placed on the bottom glass slide and pressed against the slide to form a seal. The 1 mm hole in the gasket was filled with the fluorescent dye solution. The second glass slide was placed on the top of the gasket to seal the top of the well containing fluorescent dye. The signal generator 402 was operated to provide 5 V AC peak-to-peak, 500 kHz frequency, across the top and the bottom ITO electrodes on slides, i.e., above and below the well. A bias voltage $V_{DC}=1.5$ V was applied across the bottom and top slide to achieve preconcentration of fluorescent Alexa-Fluor molecules near the bottom of the well.

Figure 5B:
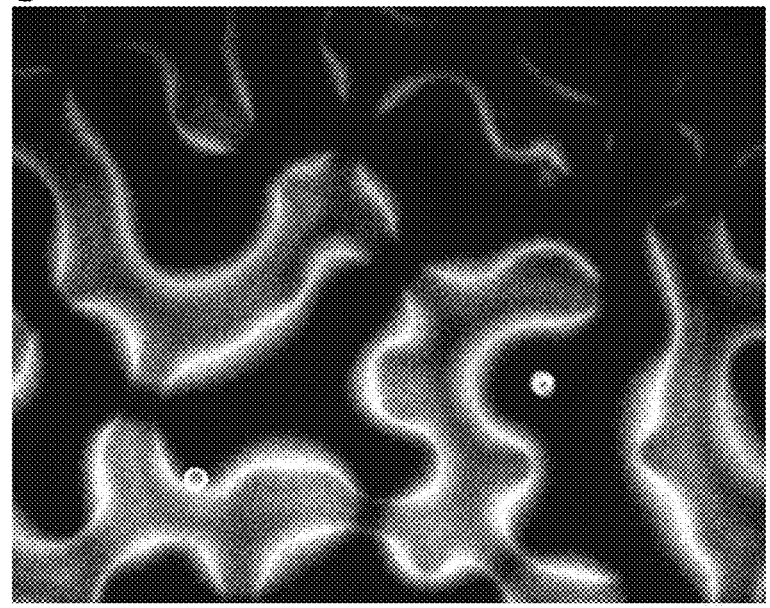

The results are shown in FIG. 5. As can be seen in the photograph in FIG. 5B, the fluorescent dye concentrates near the bottom of the well when +1.5 V DC voltage is applied across the slide along with the AC voltage. No preconcentration is seen when only AC voltage or only DC voltage is applied (5A). As described above, the present device uses displacement currents here (or AC field, see above Equation 2) to prevent the formation of an electric double layer at the liquid-dielectric interface, which will concentrate the field near one surface. The electric double layer would typically shield the entire applied DC voltage and there would be no electric field in the bulk liquid. Hence the ions in the bulk solution would not experience any electric field. By applying a high frequency AC field, the effect of the electric double layer vanishes. Hence, it is possible to have net electric field in the bulk liquid when a high frequency AC with a DC bias is applied. The AC field collapses the effect of voltage shielding due to the double layer, and DC bias creates a net electric field in the solution. One advantage of this system is that we do not need faradaic current (causing electrolysis) in the system to achieve preconcentration.

Example 3

Electric Field Directed Preconcentration of Pyrophosphate

A device was constructed essentially as shown in FIG. 4, with the following differences: instead of a camera and microscope, a magnet and a Hamamatsu photomultiplier tube was arrayed beneath the well 412, as shown at 416 in FIG. 4.

The procedure was as follows: Conductive copper tape was attached to the exposed ITO layer on the glass slides. The silicone gasket was placed on the bottom glass slide and pressed against the slide to form a seal. The 1 mm hole in the gasket was loaded with magnetic beads containing enzymes. A magnet was placed below the glass slide to hold the magnetic beads stationary. The 1 mm hole in the gasket was filled with pyrophosphate solution. The second glass slide was placed on the top of the gasket to seal the top of the well containing the chemicals. The chemicals were as follows: Pyrophosphate solution, magnetic beads loaded with ATP sulfurylase, and luciferase (obtained from 454 Life Sciences).

AC voltage 5 V peak-to-peak, 500 kHz frequency, was applied across the top and the bottom ITO slides. Bias voltage $V_{DC}$=1.5 V was applied across the bottom and top slide to achieve preconcentration of Pyrophosphate molecules near the bottom of the well.

Figure 6:
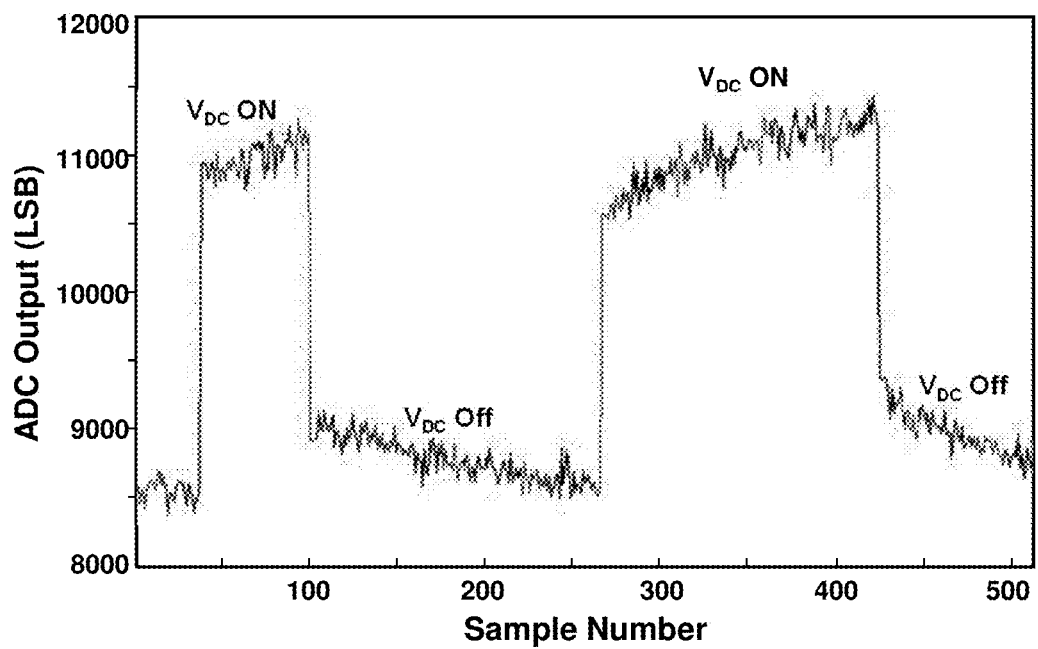
FIG. 6 is a graph showing increased chemiluminescence resulting from an electric field, which increases pyrophosphate near light generating enzymes in a reaction area.

FIG. 6 shows the output of the photomultiplier tube with and without the DC bias applied across the channel. The light signal from the chemiluminescence reaction increases when DC bias is applied due to increased concentration of pyrophosphate near the enzyme beads. When the bias is removed, the background light signal reduces back to the original level. The light signal from enzymatic reaction increases due to preconcentration of Pyrophosphate molecules near the enzyme beads at the bottom of the well when +1.5 $V_{DC}$ voltage is applied across the slide. No preconcentration is seen when only AC voltage or only DC voltage is applied. In this example, magnetic beads are used to immobilize the enzymes and there is a magnet underneath to hold the beads in place. When pure AC field is applied, there is no preconcentration since the net electric field in the bulk liquid is zero. When only DC field is applied, the electric double layer shields the applied voltage and the ions in the bulk liquid still do not experience a net electric field.

Example 4

Electric Field Directed Pyrosequencing

To perform pyrosequencing on a microfluidic chip, it is preferable to isolate individual beads in reaction wells.

To localized the light signal and generate high intensity luminescence, detection enzymes (luciferase and ATP sulfurylase) are immobilized on 0.5 µm polystyrene beads functionalized with carboxylic acids. The carboxylic acids on the beads are first transformed into amine-reactive NHS-esters using N-(3-dimethylaminopropyl)-N'-ethylcarbodiimide (DEC) and N-hydroxysuccinimide (NHS). Various protocols for coupling ligands to beads are given in "Particulate solid supports functionalized with EGTA ligands," U.S. Pat. No. 6,551,515. These NHS-esters then participate in formation of amide linkages with the amino groups on the surface of the enzymes. Loss of essential residues in the enzymes is minimized by employing two-step well-defined immobilization strategies. These relatively-transparent polystyrene beads are much smaller than the 2.8 µm non-transparent magnetic beads used by 454 (Margulies et al., 2005, cited under "Particular Patents and Publications"). Accordingly, the binding capacity is dramatically enhanced and a higher amount of enzyme units per volume of the immobilization material will result. Furthermore, the negative charges provided by the carboxylic acid groups on the beads and the net negative charges on the enzymes (PIs of 6.2-6.4, and 5.3-5.7, for firefly luciferase and ATP sulfurylase, respectively) at the Pyrosequencing pH of 7.5, will provide the beads with an effective negative charge.

Deposition of these highly charged beads into the wells is then achieved by the use of electric field (e-field). To implement e-field on the chip, transparent electrodes fabricated by deposition of thin layers of ITO (~0.1 µm) as shown in FIGS. 1-2 are used on the fiber-optic faceplate and the top cover of the fluidic chamber.

A potential difference of ~1 V is applied across the coated electrodes to avoid any electrolytic reaction and to achieve an electric field ~100 V/cm. These electrodes would also aid in deposition of the 30 µm polystyrene beads with DNA, and the 0.5 µm polystyrene enzyme beads, which possess a net negative charge. Due to the charge distribution and reduced conductivity of the bead solution, the faceplate well coverage will be improved to ~80%. We have demonstrated selective trapping of 1 µm polystyrene beads inside wells with microfabricated electrodes (as described in EXAMPLE 1).

As described above, in order to achieve active pre-concentration of the nucleotides near the reaction wells, we apply an e-field transverse to the flow direction. This strategy offers several advantages. PPi released during each pyrosequencing run is confined to the reaction well by an electric field with negative charge going into the well, and chemical cross-talk between two adjacent wells would be minimized. This is critical for future downsizing of the wells and beads for highly dense platforms. Further, the washing step can be made more efficient by simply reversing the electric field direction and hence repelling the nucleotides out of the wells. This approach is invaluable for enhancing washing efficiency to achieve long reads.

At the beginning of a pyrosequencing experiment, one performs a PPi wash to measure the light signal generated across the whole chip. The light signal from each well release should be equal in all the wells. Subsequently a wash is performed followed by cyclic addition of nucleotides. The first nucleotide sequences provide information about the key, which would help us to prime the system. This key sequence is removed from the actual sequence after base-calling to provide the nascent sequence for assembly.

CONCLUSION

The above specific description is meant to exemplify and illustrate the invention and should not be seen as limiting the scope of the invention, which is defined by the literal and equivalent scope of the appended claims. Any patents or publications mentioned in this specification are indicative of levels of those skilled in the art to which the patent pertains and are intended to convey details of the invention which may not be explicitly set out but which would be understood by workers in the field. Such patents or publications are hereby incorporated by reference to the same extent as if each was specifically and individually incorporated by reference, as needed for the purpose of describing and enabling the method or material referred to.

What is claimed is:

1. A method for moving a charged molecular species in a microfluidic device, said species moving into a reaction area from a fluid channel communicating with the reaction area, comprising the steps of:
   (a) flowing the charged molecular species in the fluid channel in a flow direction;
   (b) providing an electric field transverse to the fluid channel, comprising an alternating voltage with a superimposed DC bias voltage and having a positive end and a negative end across the reaction area; and
   (c) directing the charged molecular species into the reaction area by applying a charge to the electric field in the reaction area opposite to the charge on the molecular species.

2. The method of claim 1, wherein the reaction area contains a second molecular species, and wherein said method results in a reaction between the charged molecular species and the second molecular species.

3. The method of claim 1 further comprising the step of reversing the electric field at a frequency of at least 100 kHz.

4. The method of claim 1 wherein the electric field is reversed at a frequency wherein the frequency is a minimum of 10 kHz and a maximum of 10 MHz.

5. The method of claim 1 wherein the electric field comprises a bias voltage of at least 1 volt.

6. The method of claim 1 wherein the electric field has a strength of at least 5V/cm.

7. The method of claim 1 wherein the electric field has a bias voltage that is reversed to direct the molecular species out of the reaction area.

8. The method of claim 1 wherein the electric field is an electric displacement field.

* * * * *